United States Patent
Nakayama et al.

(10) Patent No.: US 10,781,065 B2
(45) Date of Patent: Sep. 22, 2020

(54) DETECTING DEVICE AND IMAGE FORMING APPARATUS INCORPORATING THE DETECTING DEVICE

(71) Applicants: Satoshi Nakayama, Kanagawa (JP); Hideyo Makino, Tokyo (JP); Kohta Aoyagi, Kanagawa (JP)

(72) Inventors: Satoshi Nakayama, Kanagawa (JP); Hideyo Makino, Tokyo (JP); Kohta Aoyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/155,815

(22) Filed: Oct. 9, 2018

(65) Prior Publication Data
US 2019/0202648 A1 Jul. 4, 2019

(30) Foreign Application Priority Data
Dec. 29, 2017 (JP) .................. 2017-255192

(51) Int. Cl.
| | |
|---|---|
| *B65H 7/14* | (2006.01) |
| *G01B 11/26* | (2006.01) |
| *B65H 5/06* | (2006.01) |
| *B65H 7/08* | (2006.01) |
| *B65H 7/20* | (2006.01) |
| *H04N 1/00* | (2006.01) |

(52) U.S. Cl.
CPC .............. *B65H 7/14* (2013.01); *B65H 5/06* (2013.01); *B65H 7/08* (2013.01); *B65H 7/20* (2013.01); *G01B 11/26* (2013.01); *H04N 1/0057* (2013.01); *B65H 2404/1521* (2013.01); *B65H 2511/242* (2013.01); *B65H 2511/512* (2013.01); *B65H 2513/50* (2013.01); *B65H 2801/39* (2013.01)

(58) Field of Classification Search
CPC ...... B65H 7/14; B65H 5/068; H04N 1/00615; H04N 1/0057; H04N 1/1235; H04N 1/1225; H04N 1/1215; H04N 1/125
USPC .................................. 399/361, 397
See application file for complete search history.

(56) References Cited

U.S. PATENT DOCUMENTS

| | | | |
|---|---|---|---|
| 2012/0099884 A1* | 4/2012 | Nakaie | G03G 15/5062 399/74 |
| 2013/0250377 A1 | 9/2013 | Kitai et al. | |
| 2016/0277610 A1 | 9/2016 | Kishi et al. | |

(Continued)

FOREIGN PATENT DOCUMENTS

JP 2010-114498 5/2010

*Primary Examiner* — Thomas A Morrison
(74) *Attorney, Agent, or Firm* — Duft & Bornsen, PC (57) ABSTRACT

A detecting device, which is included in an image forming apparatus, includes a detector configured to optically detect at least one of a position of a sheet, a position of an image formed on the sheet, and the image formed on the sheet, and a rotary body disposed at a position opposed to the detector and having a shaft, the rotary body being rotatable about the shaft in a sheet conveying direction of the sheet. The sheet is conveyed to space between the detector and the rotary body. The rotary body has a reference plane on an outer circumferential surface, a line formed on the reference plane and extending in a width direction perpendicular to the sheet conveying direction. The detector detects the line on the reference plane while the rotary body is rotating when the sheet does not intervene between the detector and the rotary body.

17 Claims, 5 Drawing Sheets

(56) References Cited

U.S. PATENT DOCUMENTS

| | | | |
|---|---|---|---|
| 2017/0034392 A1 | 2/2017 | Suga et al. | |
| 2018/0020108 A1* | 1/2018 | Nakayama | B65H 5/068 |
| 2018/0288240 A1* | 10/2018 | Xu | H04N 1/00087 |
| 2019/0166271 A1* | 5/2019 | Yamazaki | H04N 1/00702 |
| 2019/0166275 A1* | 5/2019 | Ishii | H04N 1/00018 |
| 2019/0171154 A1* | 6/2019 | Kobayashi | G03G 15/6558 |

* cited by examiner

DETECTING DEVICE AND IMAGE FORMING APPARATUS INCORPORATING THE DETECTING DEVICE

CROSS-REFERENCE TO RELATED APPLICATION

This patent application is based on and claims priority pursuant to 35 U.S.C. § 119(a) to Japanese Patent Application No. 2017-255192, filed on Dec. 29, 2017, in the Japan Patent Office, the entire disclosure of which is hereby incorporated by reference herein.

BACKGROUND

Technical Field

This disclosure relates to a detecting device that detects the position of a sheet, the position of an image on the sheet, and the image itself, and an image forming apparatus, such as a copier, a printer, a facsimile machine, a multi-functional apparatus including at least two functions of the copier, printer, and facsimile machine, and an offset printing machine, that includes the detecting device.

Related Art

Known image forming apparatuses such as copiers and printers are widely known to employ an image reading device (a detecting device) to detect an image formed on the surface of a sheet after a fixing process.

Specifically, a known image reading device is provided a rotatable polygonal column shaped member on which a plurality of reference planes such as white reference planes are formed in order to correct the position of an image reading body. Further, the polygonal column shaped member is rotated to cause a desired reference plate to be located at an opposed position to the image reading body, and the desired reference plate is detected by the image reading body, so as to perform desired correction by the image reading body.

Consequently, an image formed on a sheet to be conveyed at the position on the image reading device is detected with the corrected image reading body.

A known detecting device is provided with a rotary member to be disposed facing a detecting unit that detects the position of an image on a sheet so that the detecting unit detects a reference plane provided to the rotary member. However, even if the position of an image on a sheet is detected, such a known detector could not grasp the attitude of the detecting unit in a sheet conveying direction and the attitude of the detecting unit having a positional deviation on a plane of sheet conveyance.

Consequently, even if the detecting unit detects a sheet, the position of the sheet and the position of an image on the sheet or the image itself could not be detected accurately.

SUMMARY

At least one aspect of this disclosure provides a detecting device including a detector configured to optically detect at least one of a position of a sheet, a position of an image formed on the sheet, and the image formed on the sheet, and a rotary body disposed at a position opposed to the detector and having a shaft, the rotary body being rotatable about the shaft in a sheet conveying direction of the sheet. The sheet is conveyed to space between the detector and the rotary body. The rotary body has a reference plane on an outer circumferential surface, a line formed on the reference plane and extending in a width direction perpendicular to the sheet conveying direction. The detector detects the line on the reference plane while the rotary body is rotating at a given timing when the sheet does not intervene between the detector and the rotary body.

Further, at least one aspect of this disclosure provides an image forming apparatus including the above-described detecting device.

BRIEF DESCRIPTION OF THE SEVERAL VIEWS OF THE DRAWINGS

An exemplary embodiment of this disclosure will be described in detail based on the following figured, wherein.

DETAILED DESCRIPTION

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a configuration and functions of an image forming apparatus according to an embodiment of this disclosure, with reference to drawings.

It is to be noted that identical parts are given identical reference numerals and redundant descriptions are summarized or omitted accordingly.

Figure 1:
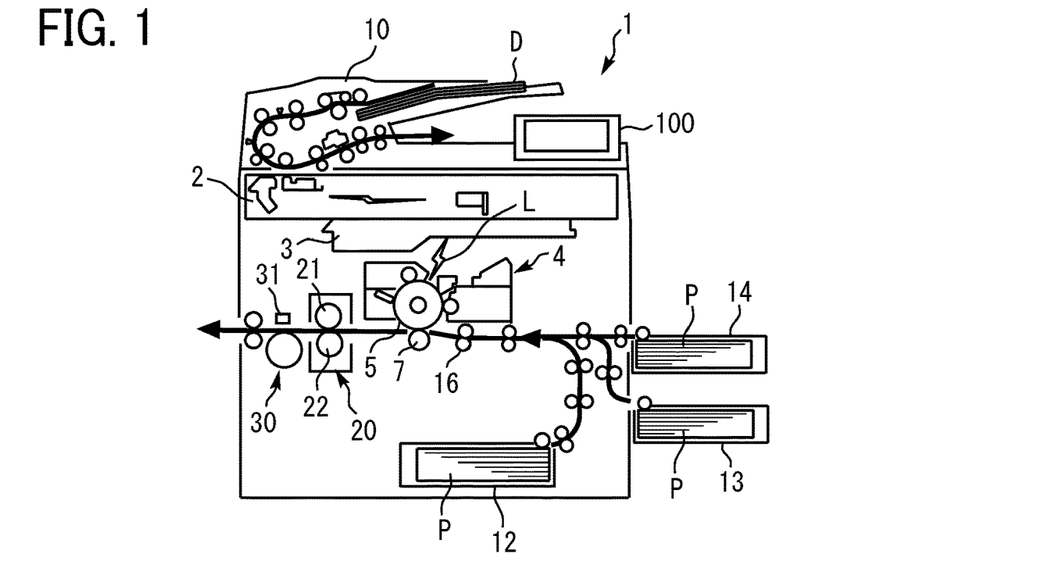
FIG. 1 is a diagram illustrating an overall configuration of an image forming apparatus according to an embodiment of this disclosure.

Now, a description is given of an overall configuration and operations of an image forming apparatus 1 according to an embodiment of this disclosure, with reference to FIG. 1. FIG. 1 is a diagram illustrating an overall configuration of the image forming apparatus 1 according to an embodiment of this disclosure.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

In FIG. 1, the image forming apparatus 1 that has a function of a copier includes a document reading device 2, an exposing device 3, an image forming device 4, a photoconductor drum 5, a transfer roller 7, a document conveying unit 10, a first sheet feeding unit 12, a second sheet feeding unit 13, a third sheet feeding unit 14, a pair of registration rollers 16, a fixing device 20, a fixing roller 21, a pressure roller 22, and a detecting device 30.

The document reading device 2 optically reads image data of an original document D.

The exposing device 3 emits an exposure light L based on the image data read by the document reading device 2 to irradiate the exposure light L onto a surface of the photoconductor drum 5 that functions as an image bearer.

The image forming device 4 forms a toner image (an image) on the surface of the photoconductor drum 5.

The transfer roller 7 functions as a transfer unit to transfer the toner image formed on the photoconductor drum 5 onto a sheet P.

The photoconductor drum 5 that functions as an image bearer and the transfer roller 7 that functions as a transfer unit are included in the image forming device 4.

The document conveying unit 10 conveys the original document D set on a document tray or loader to the document reading device 2.

The first sheet feeding unit 12, the second sheet feeding unit 13, and the third sheet feeding unit 14 are sheet trays, each of which contains the sheet P (a recording medium P) therein.

The pair of registration rollers 16 (a pair of timing rollers) conveys the sheet P toward the transfer roller 7 (an image forming area).

The fixing device 20 includes the fixing roller 21 and the pressure roller 22 to fix an unfixed image formed on the sheet P to the sheet P by application of heat by the fixing roller 21 and pressure by the pressure roller 22.

The detecting device 30 to detect the position of the sheet P and the position of the image formed on the sheet P after the fixing process and also functions as an image reading device to read the image formed on the sheet P.

Now, a description is given of regular image forming operations performed by the image forming apparatus 1, with reference to FIG. 1.

The original document D is fed from a document loading table provided to the document conveying unit 10 and conveyed by multiple pairs of sheet conveying rollers disposed in the document conveying unit 10 in a direction indicated by arrow in FIG. 1 over the document reading device 2. At this time, the document reading device 2 optically reads image data of the original document D passing over the document reading device 2.

Consequently, the image data optically scanned by the document reading device 2 is converted to electrical signals. The converted electrical signals are transmitted to the exposing device 3 (a writing portion) by which the image is optically written. Then, the exposing device 3 emits the exposure light (laser light) L based on the image data of the electrical signals toward the surface of the photoconductor drum 5 of the image forming device 4.

By contrast, the photoconductor drum 5 of the image forming device 4 rotates in a clockwise direction in FIG. 1. After a series of predetermined image forming processes, e.g., a charging process, an exposing process, and a developing process is completed, an image (i.e., a toner image) corresponding to the image data is formed on the surface of the photoconductor drum 5.

Then, the toner image formed on the surface of the photoconductor drum 5 is transferred onto the sheet P that is conveyed by the pair of registration rollers 16, in an image forming area (i.e., a transfer nip region) in which the transfer roller 7 and the photoconductor drum 5 contact to each other.

Now, referring to FIG. 1, a description is given of movement of the sheet P to be conveyed to the position of the transfer roller 7 (i.e., the image forming area).

First, one of the first sheet feeding unit 12, the second sheet feeding unit 13 and the third sheet feeding unit 14 of the image forming apparatus 1 is selected automatically or manually. It is to be noted that the first sheet feeding unit 12, the second sheet feeding unit 13 and the third sheet feeding unit 14 basically have an identical configuration to each other, except the second sheet feeding unit 13 and the third sheet feeding unit 14 disposed outside an apparatus body of the image forming apparatus 1. The following description is given of an operation in a case in which the first sheet feeding unit 12 disposed inside the apparatus body of the image forming apparatus 1 is selected.

An uppermost sheet P placed on top of multiple sheets P contained in the first sheet feeding unit 12 is fed by a sheet feed roller toward a sheet conveyance passage.

Thereafter, the sheet P reaches the pair of registration rollers 16. Then, the sheet P is conveyed by the pair of registration rollers 16 toward the position of the transfer roller 7 (i.e., the image forming area) in synchronization with movement of the image formed on the photoconductor drum 5, so that the position of the image formed on the photoconductor drum 5 and the position of the sheet P meet.

After completion of a transfer process, the sheet P passes the transfer roller 7 and reaches the fixing device 20 through the sheet conveyance passage. In the fixing device 20, the sheet P is inserted to a fixing nip region between the fixing roller 21 and the pressure roller 22, so that the toner image is fixed to the sheet P by application of heat applied by the fixing roller 21 and pressure applied by the fixing roller 21 and the pressure roller 22. After having been discharged from the fixing roller 21 and the pressure roller 22 (i.e., the fixing nip region) of the fixing device 20, the sheet P having the toner image fixed thereto reaches the position of the detecting device 30. Then, at the position of the detecting device 30, the position (attitude) of the sheet P, the position of the image formed on the surface of the sheet P, and the image formed on the surface of the sheet P are detected. Details of this operation are described below. After passing the position of the detecting device 30, the sheet P is discharged from the apparatus body of the image forming apparatus 1.

Accordingly, a series of the image forming processes is completed.

Now, a detailed description is given of the detecting device 30 included in the image forming apparatus 1 according to the present embodiment, with reference to FIGS. 2 through 6.

As described above with reference to FIG. 1, the image forming apparatus 1 according to the present embodiment includes the detecting device 30 disposed downstream from the fixing device 20 in the sheet conveying direction.

While conveying the sheet P having the image thereon, the detecting device 30 detects (scans) the position of the sheet P (i.e., a sheet attitude), the position of the image formed on the surface of the sheet P (i.e., an image position), and the image formed on the surface of the sheet P (i.e., image data), on the downstream side from the fixing device 20.

Figure 2:
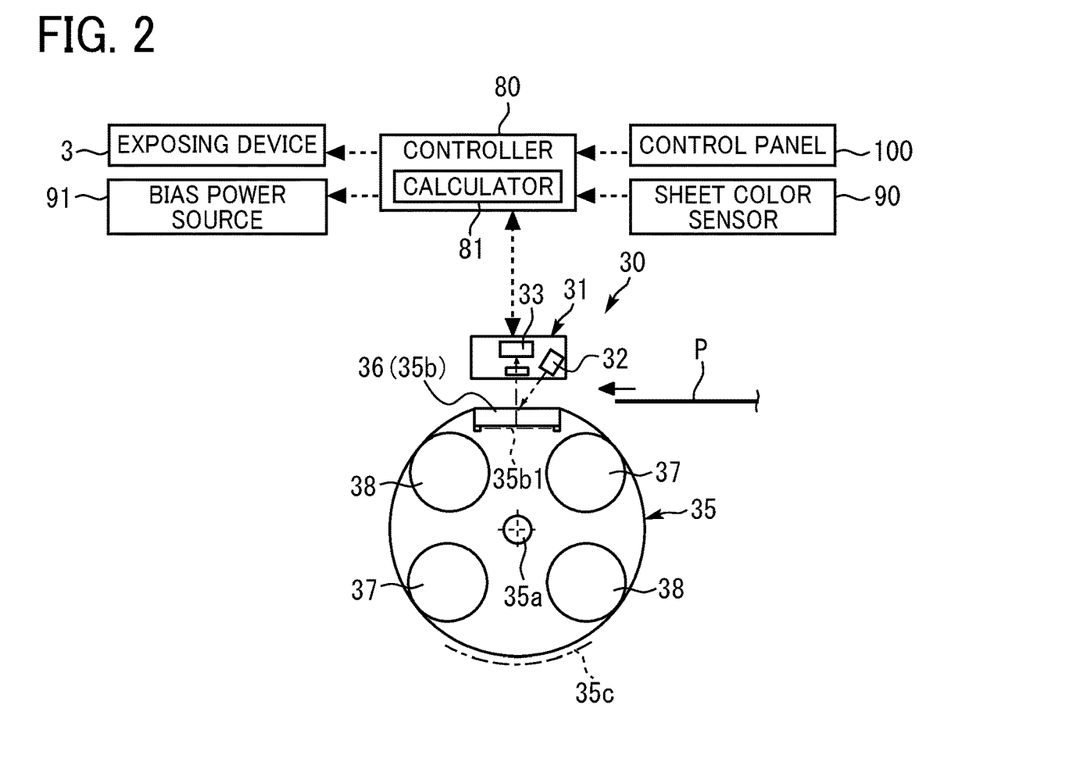
FIG. 2 is a diagram illustrating a detecting device included in the image forming apparatus of FIG. 1.
Figure 3A:
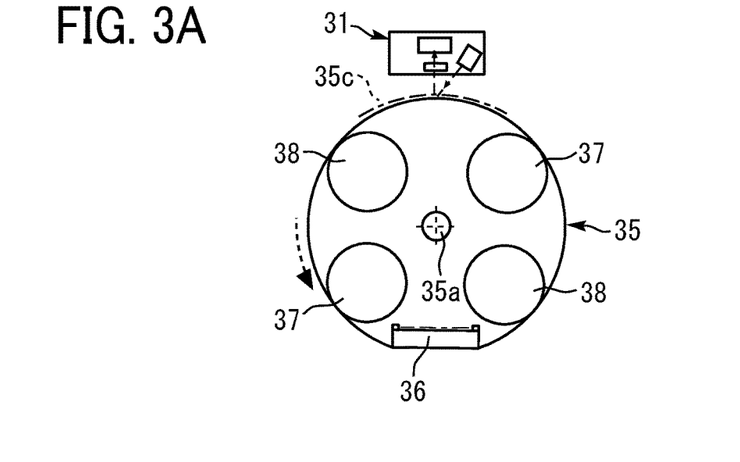
FIG. 3A is a diagram illustrating the detecting device in shading correction.
Figure 3B:
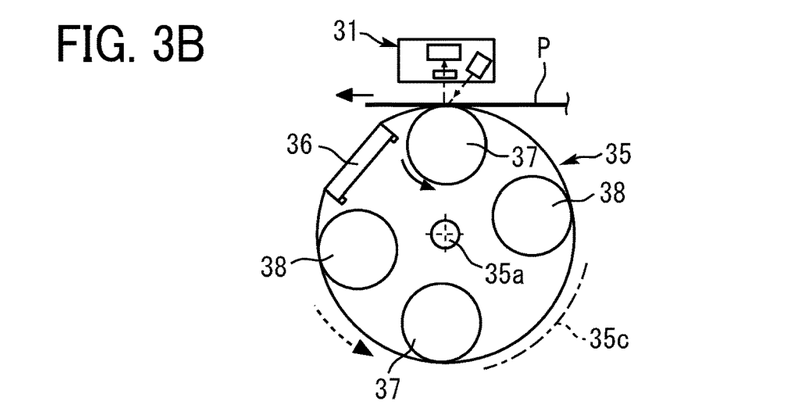
FIG. 3B is a diagram illustrating the detecting device when a white sheet is conveyed.
Figure 3C:
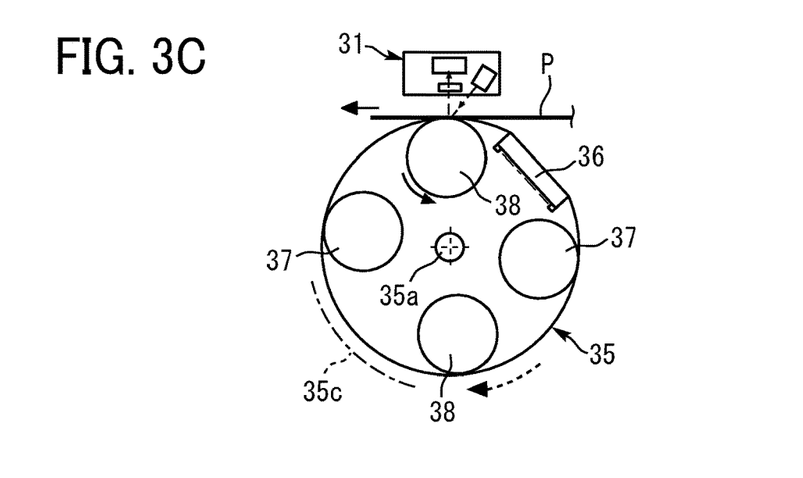
FIG. 3C is a diagram illustrating the detecting device when a sheet other than the white sheet is conveyed.

Specifically, as illustrated in FIGS. 2 and 3, the detecting device 30 includes a CIS (contact image sensor) 31 that functions as a detector and a revolver 35 that functions as a rotary body.

The CIS 31 (functioning as a detector) is fixed and held by a housing of the detecting device 30 such that the CIS 31 is disposed opposed to an image forming face on the sheet P to be conveyed. The CIS 31 is formed to extend in a width direction of the sheet P (i.e., a direction vertical to the drawing sheets of FIGS. 1 through 3 and the left and right direction in FIG. 5) and is disposed to cover an area in the width direction of the sheet P.

Figure 5A:
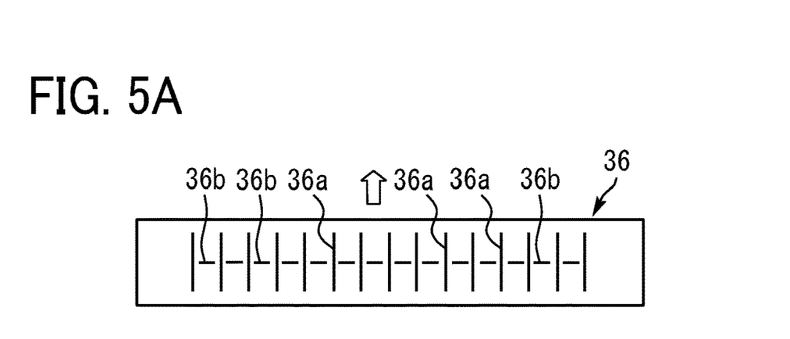
FIG. 5A is a top view illustrating the glass scale.
Figure 5B:
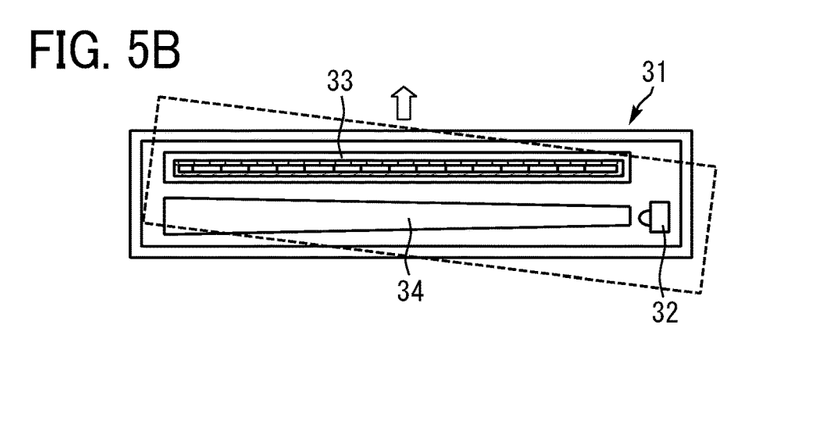
FIG. 5B is a diagram illustrating a CIS in the width direction.

Referring to FIGS. 2 and 5B, the CIS 31 according to the present embodiment includes a light source 32, a light guide body 34, a lens array, an array substrate, and a light receiving element array 33.

The light source 32 is disposed at one end portion in the width direction of the CIS 31 and emits light from the one end portion in the width direction to the other end in the width direction (i.e., to the light guide body 34). The light emitted from the light source 32 irradiates a detection target body (for example, the sheet P and a glass scale 36) via the light guide body 34.

The light guide body 34 causes the light emitted from the light source 32 to be distributed in the width direction and to incident to the detection target body. By providing the light guide body 34, the light emitted from the light source 32 that is disposed at the one end side in the width direction of the CIS31 enters across the area in the width direction of the detection target body (i.e., the area in the width direction corresponding to a detection range of the CIS 31).

The light receiving element array 33 includes multiple light receiving elements aligned in the width direction on the array substrate. The light receiving element array 33 is arranged to extend in the width direction and receives the reflection light reflected on the detection target body (i.e., the reflection light that is incident from the light source 32) via the lens array. Consequently, the reflection light from the detection target body is received by the light receiving element array 33, so that the position of the sheet P and the image position on the sheet P are detected or the image data on the sheet P (the image density) is detected, depending on the size (i.e., the intensity of illumination) of the reflection light. In other words, the CIS 31 (the detector) optically detects at least one of the position of the sheet P, the position of an image formed on the surface of the sheet P, and the image formed on the surface of the sheet P.

It is to be noted that the CIS 31 according to the present embodiment includes a single light source such as the light source 32 corresponding to multiple light receiving elements aligned in the width direction. However, the configuration of the CIS 31 is not limited thereto. For example, multiple light emitting elements aligned in the width direction of the CIS 31 may be used to function as a light source corresponding to multiple light receiving elements aligned in the width direction.

By contrast, the revolver 35 (the rotary body) is disposed at a position opposed to the CIS 31 so that the sheet P is conveyed to space provided between the revolver 35 and the CIS 31 (the detector). Specifically, the revolver 35 is disposed facing a non-image forming face of the sheet P (e.g., a front face of the sheet P to the sheet P having images printed on both faces by duplex printing). A gap or space between the revolver 35 and the CIS 31 is set to have an appropriate distance (not too wide or not too narrow) so that the sheet P is preferably conveyed while contacting the revolver 35.

Further, the revolver 35 (the rotary body) is rotatable about a support shaft 35a (i.e., the center of rotation) in a direction along the sheet conveying direction of the sheet P. Specifically, the revolver 35 (the rotary body) is held by an apparatus body of the detecting device 30 to be rotatable about the support shaft 35a. The support shaft 35a of the revolver 35 is coupled to a motor shaft of a drive motor (i.e., a motor to be rotatable in a forward direction and a reverse direction).

With this configuration, the revolver 35 is disposed facing the CIS 31 at a desired attitude (position) in the rotation direction of the revolver 35 based on a control of the drive motor of a controller 80 and a detection result of an encoder that detects the attitude in the rotation direction of the revolver 35. In other words, the glass scale 36 of the revolver 35 is opposed to the CIS 31 as illustrated in FIG. 2, a white reference plane 35c of the revolver 35 is opposed to the CIS 31 as illustrated in FIG. 3A, first rollers 37 (black rollers) of the revolver 35 are opposed to the CIS 31 as illustrated in FIG. 3B, and second rollers 38 (white rollers) of the revolver 35 are opposed to the CIS 31 as illustrated in FIG. 3C. Specifically, the revolver 35 according to the present embodiment is rotatable in the forward direction and the reverse direction.

Here, the revolver 35 (the rotary body) according to the present embodiment is formed not in a polygonal column shape but formed in a substantially cylindrical shape. That is, the revolver 35 has an outer circumferential surface formed by a substantially curved face without any large corners.

According to this shape of the revolver 35, even when the revolver 35 is rotated, it is less likely that the sheet P that is conveyed to the space between the revolver 35 and the CIS 31 is caught by the revolver 35 and generated defects such as paper jam.

Further, as illustrated in FIGS. 2 and 3, the revolver 35 (the rotary body) is provided with the glass scale 36 that functions as a light transmitting body, two first rollers 37 (black rollers), and two second rollers 38 (white rollers). Further, a portion of the outer circumferential surface of the revolver 35 is painted white to form the white reference plane 35c. It is to be noted that, in this configuration, the portion of the outer circumferential surface of the revolver 35 is painted white. However, the outer circumferential surface of the revolver 35 is not limited to be "painted" as long as the color of the outer circumferential surface of the revolver 35 is white.

A reference plane S is formed on a part of the outer circumferential surface of the revolver 35 (the rotary body) according to the present embodiment. On the reference plane S, multiple parallel lines 36a are formed in parallel and extending in the sheet conveying direction (i.e., in the left and right direction in FIGS. 2 and 3 and in the vertical direction in FIG. 5) at equal intervals in the width direction and a series line 36b are formed in series extending in the width direction (i.e., in a direction perpendicular to the sheet conveying direction). The reference plane S is provided on an opposed face of the glass scale 36 (the light transmitting body) to the CIS 31 (the detector).

Figure 4:
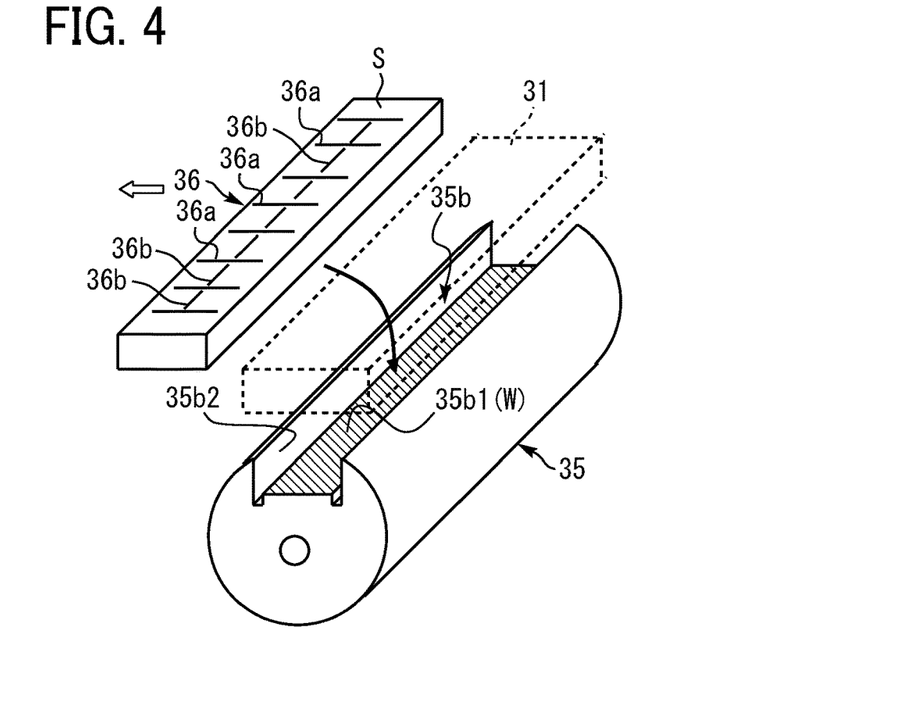
FIG. 4 is a perspective view illustrating a state in which a glass scale is attached to a groove of a revolver, without illustrating first rollers and second rollers.

Specifically, on the glass scale 36 (the light transmitting body), as illustrated in FIGS. 4 and 5A, the multiple parallel lines 36a (line drawings) formed in parallel extending in the sheet conveying direction (i.e., a direction indicated by white arrow) and the series line 36b (line drawings) formed in series extending in the width direction on the opposed face (the reference plane S) opposed to the CIS 31. More specifically, the multiple parallel lines 36a are formed at the same pitches of each light receiving element of the light receiving element array 33. Further, the series line 36b includes multiple series line portions 36b formed in series along the width direction at equal intervals in the same axis (coaxially) so that each series line portion of the series line 36b is formed between adjacent two parallel lines 36a of the multiple parallel lines 36a at a substantially center of the glass scale 36 in the sheet conveying direction. It is to be noted that each of the multiple series line portions 36b of the series line 36b may be in contact with the adjacent two parallel lines 36a of the multiple parallel lines 36a or may be separated from the adjacent two parallel lines 36a of the multiple parallel lines 36a. As described above, the glass scale 36 is provided with scales including parallel and series lines on the opposed face (i.e., the reference plane S).

It is to be noted that, in the present embodiment, the parallel lines 36a and the series line 36b as line drawings are formed in black by applying chrome deposition on the glass scale 36.

More specifically, as illustrated in FIGS. 2 through 4, the revolver 35 (the rotary body) includes a groove 35b having a substantially rectangular shape on a part of the outer circumferential surface of the revolver 35. The groove 35b extends in the width direction (i.e., in the vertical direction to the drawing sheets of FIGS. 2 and 3 and in an axial direction of the revolver 35). The glass scale 36 (the light transmitting body) that has a substantially rectangular shape is formed by transparent glass material through which light is transparent is fit into the groove 35b. Specifically, the groove 35b according to the present embodiment is formed slightly greater in size than the glass scale 36. Further, the glass scale 36 is fit into the groove 35b in a state in which the glass scale 36 contacts an inner wall face 35b2 of the groove 35b on the upstream side of the sheet conveying direction, and is fixedly disposed to the revolver 35 with an elastic member such as a panel spring being fit to the gap on the outside of a sheet conveyance area.

In addition, the groove 35*b* of the revolver 35 has a bottom face 35*b*1 (see FIG. 4) on which a surface layer W of a specified color (e.g., color of white in the present embodiment of this disclosure) is formed. The surface layer W is applied (painted) with the color of white (specified color). Various methods of painting may be applied to paint the surface layer W with the color of white, for example, brush painting, spray painting, powder coating, electrostatic painting, and electrodeposition coating.

Figure 6A:
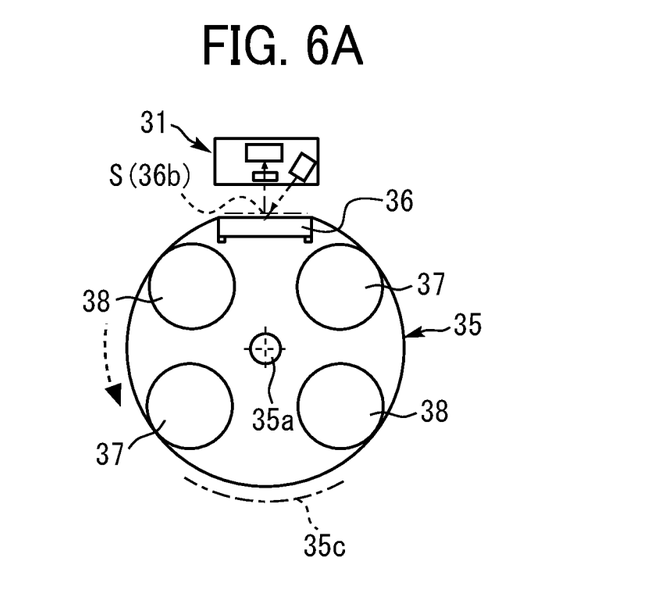
FIG. 6A is a diagram illustrating the detecting device when detecting a series line on the glass scale.
Figure 6B:
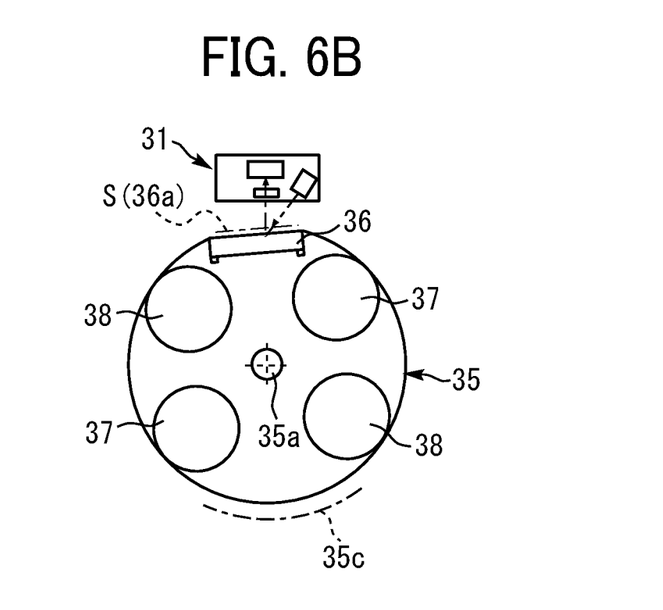
FIG. 6B is a diagram illustrating the detecting device when detecting parallel lines on the glass scale.

Consequently, when the revolver 35 (the rotary body) is rotated about the support shaft 35*a* (i.e., the state in FIGS. 2 and 6) so that the glass scale 36 (the light transmitting body) is opposed to the CIS 31 (the detector), the CIS 31 detects the parallel lines 36*a* and the series line 36*b* with (the surface layer W of) the bottom face 35*b*1 of the groove 35*b* being as a background color to detect the attitude of the CIS 31. Details of this operation is described below with reference to FIG. 6.

As described above, the glass scale 36 is used to detect the attitude (the position) of the CIS 31. The glass scale 36 is also used to protect the surface layer W (i.e., the bottom face 35*b*1) that functions as a background color when detecting the line drawings i.e., the parallel lines 36*a* and the series line 36*b*, from scratch or against dust.

It is to be noted that, in the present embodiment, the glass scale 36 including glass material as a light transmitting body is used. However, the material of the light transmitting body is not limited thereto. For example, the light transmitting body may be formed by a transparent resin material (for example, transparent film).

Further, in order to approximate a state in which the CIS 31 optically detects the line drawings 36*a* and 36*b* to a detection state in which the CIS 31 performs detection when the sheet P is conveyed, a distance of the CIS 31 and the opposed face of the glass scale 36 to the CIS 31 is set to be equal to a distance of the CIS 31 and the sheet P to be conveyed.

Further, the white reference plane 35*c* (i.e., a second reference plane) is formed on a portion of the outer circumferential surface of the revolver 35 and at a position that is shifted by an angle of approximately 180 degrees from the position of the glass scale 36.

Consequently, when the revolver 35 (the rotary body) is rotated about the support shaft 35*a* (i.e., the state in FIG. 3A) so that the white reference plane 35*c* is opposed to the CIS 31 (the detector), the CIS 31 causes the light incident from the light source 32 of the CIS 31 to irradiate the white reference plane 35*c* and receives the reflection light reflected by the white reference plane 35*c* by the light receiving elements via the glass scale 36, so as to perform output adjustment (i.e., shading correction) of the CIS 31.

To be more specific, the output value of each light receiving element is adjusted so that the output values of the multiple light receiving elements (the light receiving element array 33) become uniform at respective values exceeding the threshold values when the CIS 31 detects the white reference plane 35*c* in a state in which the sheet P does not intervene between the glass scale 36 and the CIS 31 (for example, a state immediately before the image forming operation starts). By performing the above-described output adjustment (the shading correction), the detection accuracy in actual detection of the position of the sheet P, the position of an image on the sheet P, and the image data by the CIS 31 is enhanced.

It is to be noted that, in order to approximate a state in which the CIS 31 optically detects the white reference plane 35*c* to a detection state in which the CIS 31 performs detection when the sheet P is actually conveyed, a distance of the CIS 31 and the white reference plane 35*c* to the CIS 31 is set to be equal to the distance of the CIS 31 and the sheet P to be conveyed. Further, the white reference plane 35*c* is curved along the outer circumferential surface of the revolver 35 so that the distance of the CIS 31 and the white reference plane 35*c* does not change even if the attitude (the rotation angle) in the rotation direction of the revolver 35 shifts by a certain amount from a target when the CIS 31 detects the white reference plane 35*c* to perform the shading correction.

The revolver 35 (the rotary body) includes first rollers 37 and second rollers 38 that are rotatably provided and are rotated separately from the revolver 35.

Then, as illustrated in FIGS. 3B and 3C, in a state in which the first rollers 37 and the second rollers 38 are opposed to the CIS 31 (the detector), the sheet P is conveyed to the space between the CIS 31 and the revolver 35 while the first rollers 37 and the second rollers 38 are rotating in a counterclockwise direction in FIG. 3B along the sheet conveying direction.

Here, the first rollers 37 (the black rollers) are two rollers each having an outer circumferential surface painted black. It is to be noted that, in this configuration, the portion of the outer circumferential surface of each of the first rollers 37 is painted black. However, the outer circumferential surface of each of the first rollers 37 is not limited to be "painted" as long as the color of the outer circumferential surface of each of the first rollers 37 is black.

The two first rollers 37 are rotatably attached at respective positions apart from each other by an angle of approximately 180 degrees on the revolver 35. The two first rollers 37 are driven and rotated by respective motors independent (different) from the drive motor that drives the revolver 35. Further, the black roller portions of the first rollers 37 are set to have a length in the width direction to cover an area in the width direction of the sheet P.

As illustrated in FIG. 3B, while conveying the white sheet P along with rotation of the first rollers 37 (the black rollers) in the counterclockwise direction between the first rollers 37 (the black rollers) and the CIS 31, the CIS 31 optically detects the position of the sheet P (i.e., an end portion in the width direction of the sheet P or the leading end of the sheet P) and the position of the image formed on the sheet P (i.e., the image position) with the first rollers 37 (the black rollers) being as a background face. Consequently, based on the detection results, a write timing and a write position in a main scanning direction (the width direction) in the exposing device 3 (the writing device) are adjusted, and therefore the accuracy of the image position of the image formed on the sheet P is enhanced.

Further, the CIS 31 optically detects the image position on the sheet P in a state in FIG. 3B while conveying the white sheet P. By so doing, various image data on the sheet P (for example, data of the image density) can be read. Consequently, based on the image data detected by the detecting device 30 that also functions as an image reading device, an image forming condition (for example, a bias power source 91 that outputs a developing bias to adjust the image density) is adjusted, and therefore the quality of the image to be formed on the sheet P is enhanced.

Further, the second rollers 38 (the white rollers) are two rollers each having an outer circumferential surface painted white. It is to be noted that, in this configuration, the portion of the outer circumferential surface of each of the second rollers 38 is painted white. However, the outer circumferential surface of each of the second rollers 38 is not limited to be "painted" as long as the color of the outer circumferential surface of each of the second rollers 38 is white.

The two second rollers 38 are rotatably attached at respective positions apart from each other by an angle of approximately 180 degrees on the revolver 35. The two second rollers 38 are driven and rotated by respective motors independent (different) from the drive motor that drives the revolver 35. Further, the white roller portions of the second rollers 38 are set to have a length in the width direction to cover an area in the width direction of the sheet P.

As illustrated in FIG. 3C, while conveying a non-white sheet P, that is, the sheet P of a color other than white along with rotation of the second rollers 3 (the white rollers) in the counterclockwise direction between the second rollers 38 (the white rollers) and the CIS 31, the CIS 31 optically detects the position of the sheet P (i.e., an end portion in the width direction of the sheet P or the leading end of the sheet P) and the position of the image formed on the sheet P (i.e., the image position) with the second rollers 38 (the white rollers) being as a background face. Consequently, based on the detection results, the write timing and the write position in the main scanning direction (the width direction) in the exposing device 3 (the writing device) are adjusted, and therefore the accuracy of the image position of the image formed on the sheet P is enhanced.

Further, the CIS 31 optically detects the image position on the sheet P in a state in FIG. 3C while conveying the non-white sheet P. By so doing, various image data on the sheet P (for example, data of the image density) can be read. Consequently, based on the image data detected by the detecting device 30 that also functions as an image reading device, an image forming condition (for example, the bias power source 91 that outputs the developing bias to adjust the image data) is adjusted, and therefore the quality of the image to be formed on the sheet P is enhanced.

As described above, in the present embodiment of this disclosure, the revolver 35 is rotated appropriately to bring the first rollers 37 and the second rollers 38 having different colors to each other to face the CIS 31, so that, even when the non-white sheet P is conveyed, the background color is not the same color as the sheet color, and therefore the CIS 31 clearly detects the position of the sheet P (for example, an end portion in the width direction of the sheet P or the leading end of the sheet P).

Further, in the present embodiment of this disclosure, the glass scale 36, one of the first rollers 37, one of the second rollers 38, the white reference plane 35c, the other of the first rollers 37, and the other of the second rollers 38 are disposed in this order along the circumferential direction of the revolver 35. Therefore, a time to take for the switching operation is reduced. In other words, a time for the operation to change a member disposed facing the CIS 31 from the glass scale 36 to either of the first rollers 37 (or from either of the first rollers 37 to the glass scale 36), from the glass scale 36 to either of the second rollers 38 (or from either of the second rollers 38 to the glass scale 36), from either of the first rollers 37 to either of the second rollers 38 (or from either of the second rollers 38 to either of the first rollers 37), from the white reference plane 35c to either of the first rollers 37 (or from either of the first rollers 37 to the white reference plane 35c), and from the white reference plane 35c to either of the second rollers 38 (or from either of the second rollers 38 to the white reference plane 35c) is reduced.

It is to be noted that the switching control of the first rollers 37 and the second rollers 38 disposed facing the CIS 31 may be performed based on data (of color) of the sheet P to be input to a control panel 100 (disposed to an exterior of the apparatus body of the image forming apparatus 1) by a user or may be performed based on the detection result of a sheet color sensor 90 (i.e., a photosensor disposed in the sheet conveyance passage from the sheet feeding device to the detecting device 30) to directly detect the color of the sheet P to be conveyed.

Next, a detailed description is given of the control to cause the reference plane S of the revolver 35 (the glass scale 36) to face the CIS 31 with reference to FIGS. 6A and 6B.

As illustrated in FIG. 6A, in the detecting device 30 according to the present embodiment, when the sheet P does not intervene between the CIS 31 (the detector) and the revolver 35 (the rotary body), the CIS 31 of the detecting device 30 according to the present embodiment detects the series line 36b on the reference plane S with the surface layer W being as a background color at a predetermined timing (for example, at a warming up before performing the image forming operation) while rotating revolver 35.

At this time, the rotation speed of the revolver 35 is constant from a timing immediately before the CIS 31 detects the series line 36b to a timing immediately after the CIS 31 has detected the series line 36b. Specifically, it is preferable that the linear velocity of the rotation speed of the revolver 35 is equal to the conveying speed of the sheet P. Therefore, in a case in which the rotation control of the revolver 35 employs a slow-up and slow-down control in which the rotation speed of the revolver 35 is gradually increased or gradually decreased, it is preferable to set that the CIS 31 detects the series line 36b when the speed is stabilized to a constant velocity.

As described above, by rotating the revolver 35 on which the series line 36b is formed, the series line 36b passes right under the optical axis of the CIS 31 so that the CIS 31 reads (detects) the series line 36b as a line. Consequently, based on the series line 36b detected by the CIS 31, the attitude of the CIS 31 in the sheet conveying direction and the attitude of the CIS 31 rotated (deviated) on a plane of sheet conveyance of the sheet P are grasped (detected) accurately.

Specifically, in the controller 80, a calculator 81 calculates the attitude of the CIS 31 in the sheet conveying direction and the attitude of the CIS 31 rotated (deviated) on the plane of sheet conveyance of the sheet P (for example, the attitude indicated with a broken line in FIG. 5B) based on the detection result of the series line 36b obtained at the predetermined timing by the CIS 31. Then, based on the detection results obtained by the calculator 81, the detection result of the CIS 31 to detect the sheet P (i.e., the sheet position, the image position, and the image data) to be conveyed to the space between the CIS 31 and the revolver 35 are corrected (i.e., the registration correction in the sub-scanning direction and the angular displacement correction).

By performing the correction, the CIS 31 detects the position of the sheet P, the position of the image on the sheet P, and the image data accurately.

To be more specific, in the state in which the sheet P is not conveyed to the space between the glass scale 36 and the CIS 31, as the CIS 31 detects the series line 36b that moves at equal speed in the sheet conveying direction, the amount of the positional deviation (for example, a positional deviation caused by part dimension error or assembly error) of the CIS 31 to a target position in the sheet conveying direction is grasped from the detection timing. Accordingly, by correcting the detection result of the CIS 31 obtained when the sheet P is actually conveyed based on the detection result, the detection accuracy of the leading end position and the trailing end position of the sheet P in the sheet conveying direction to be detected by the CIS 31 and the detection accuracy of the position of the image on the sheet P in the sheet conveying direction to be detected by the CIS 31 are enhanced.

Further, by detecting the shift of the detection timing of the multiple series line portions of the series line 36b by the CIS 31 (i.e., the multiple light receiving elements), the amount of angular deviation of the CIS 31 to the target attitude (i.e., the attitude in the rotation direction on the plane of sheet conveyance) is grasped. Accordingly, by correcting the detection result of the CIS 31 obtained when the sheet P is actually conveyed based on the detection result, the detection accuracy of the angular deviation (skew) of the sheet P to be detected by the CIS 31 and the detection accuracy of the angular deviation of the image on the sheet P to be detected by the CIS 31 are enhanced.

Further, in the detecting device 30 according to the present embodiment, when the sheet P does not intervene between the CIS 31 (the detector) and the revolver 35 (the rotary body) as illustrated in FIG. 6B and after the CIS 31 has detected the series line portions of the series line 36b at the predetermined timing, as described above with reference to FIG. 6A, the CIS 31 detects the multiple parallel lines 36a on the reference plane S (the glass scale 36) with the surface layer W being as a background color while rotation of the revolver 35 (the rotary body) is stopped.

At this time, it is preferable that the CIS 31 detects the multiple parallel lines 36a when the predetermined time has elapsed from the stop of rotation of the revolver 35 while the revolver 35 has no vibration.

As described above, the CIS 31 reads (detects) the multiple parallel lines 36a in the state in which the revolver 35 is stopped rotating and has no vibration. By so doing, the attitude of the CIS 31 in the width direction is grasped (detected) accurately.

Specifically, in the controller 80, after the CIS 31 has detected the series line portions of the series line 36b at the predetermined timing, the calculator 81 calculates the attitude of the CIS 31 in the width direction based on the detection result of the multiple parallel lines 36a obtained by the CIS 31. Then, based on the detection results obtained by the calculator 81, the detection result obtained by the CIS 31 to detect the sheet P (i.e., the sheet position, the image position, and the image data) to be conveyed to the space between the CIS 31 and the revolver 35 are corrected (i.e., the registration correction in the main scanning direction).

By performing the correction, the CIS 31 detects the position of the sheet P, the position of the image on the sheet P, and the image data accurately.

To be more specific, in the state in which the sheet P is not conveyed to the space between the glass scale 36 and the CIS 31, as the CIS 31 detects the multiple parallel lines 36a that are not moving, the positional deviation (for example, a positional deviation caused by part dimension error or assembly error) of the CIS 31 to the target position in the width direction is grasped. Accordingly, by correcting the detection result obtained by the CIS 31 when the sheet P is actually conveyed based on the detection result, the detection accuracy of the position of the end portion in the width direction of the sheet P to be detected by the CIS 31 and the detection accuracy of the position in the width direction of the image formed on the sheet P to be detected by the CIS 31 are enhanced. It is noted that one end portion in the width direction of the sheet P is detected in the present embodiment but both end portions in the width direction of the sheet P may also be detected.

It is to be noted that, in the present embodiment of this disclosure, the multiple parallel lines 36a are detected by the CIS 31 while the revolver 35 is not rotating after the CIS 31 has detected the multiple series line portions of the series line 36b at the predetermined timing. However, the operation is not limited thereto. For example, the multiple parallel lines 36a may be detected by the CIS 31 while the revolver 35 is not rotating before the CIS 31 detects the multiple series line portions of the series line 36b at the predetermined timing.

Further, in the present embodiment of this disclosure, the reference plane S on which the parallel lines 36a and the multiple series line portions of the series line 36b are formed are flat shaped. However, the shape of the reference plane S is not limited thereto. For example, the reference plane S may have a curved surface that is curved along the outer circumferential surface of the revolver 35.

Variation.

Figure 7A:
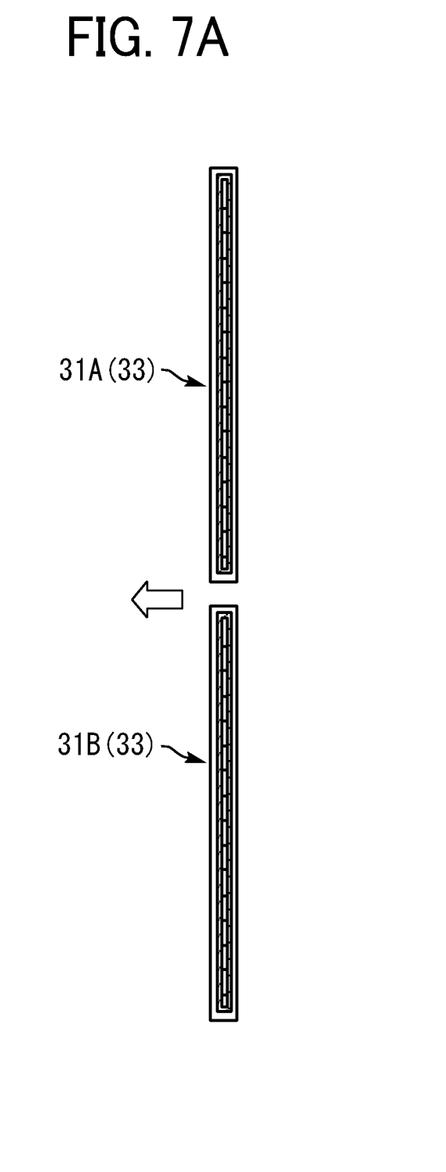
FIGS. 7A and 7B are schematic top views illustrating detectors, as a variation of the embodiment of this disclosure.
Figure 7B:
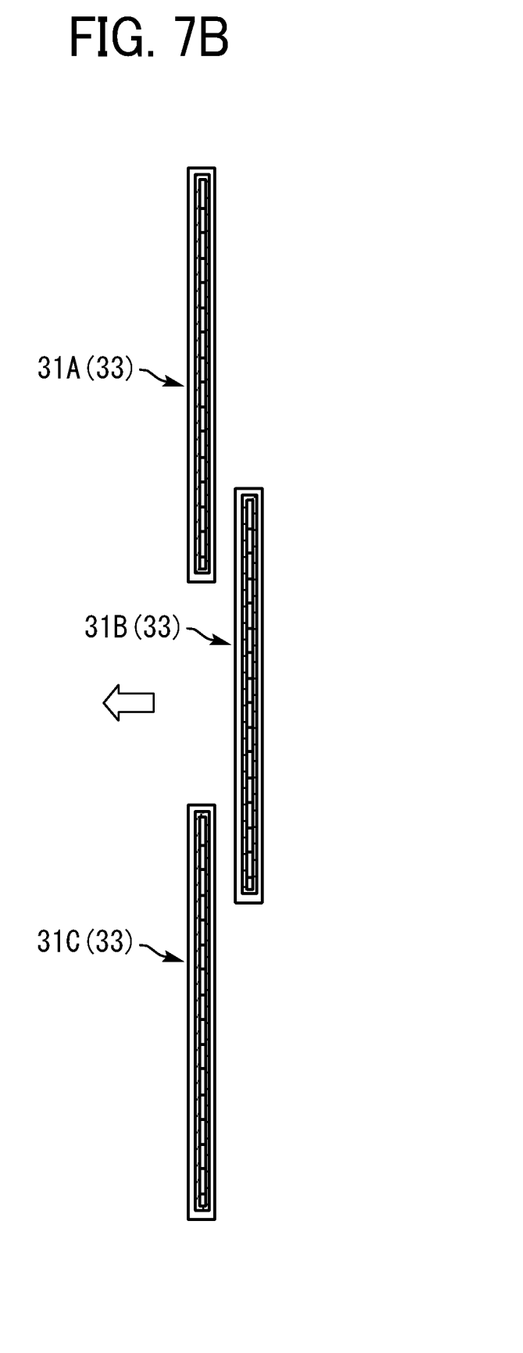

FIGS. 7A and 7B are schematic top views illustrating detectors, as a variation (hereinafter, referred to as "Variation") of the present embodiment of this disclosure.

The detector in Variation basically has the configuration identical to the CIS 31 as a single unit according to the present embodiment of this disclosure. That is, the detector in Variation is different from the CIS 31 according to the present embodiment in that the detector in Variation includes a first CIS 31A and a second CIS 31B (occasionally, and a third CIS 31C) disposed in parallel to the width direction or in a zigzag shape in the width direction while the CIS 31 in the present embodiment includes a single CIS 31 disposed extending in the width direction.

Specifically, the detector illustrated in FIG. 7A includes two CISs, which are the first CIS 31A and the second CIS 31B disposed in parallel to the width direction (i.e., an upward and downward direction in FIG. 7A). In this case, it is preferable that the first CIS 31A and the second CIS 31B have no gap or space between the respective light receiving element arrays 33.

Further, the detector illustrated in FIG. 7B includes three CISs, which are the first CIS 31A, the second CIS 31B, and the third CIS 31C disposed in a zigzag shape in the width direction (i.e., the upward and downward direction in FIG. 7B). In this case, the first CIS 31A and the second CIS 31B (or the second CIS 31B and the third CIS 31C) disposed adjacent to each other are disposed such that the respective areas of the end portion in the width direction of the respective light receiving element arrays 33 are overlapped. With this configuration, the data obtained by the first CIS 31A, the second CIS 31B, and the third CIS 31C are synthesized to link to each other by taking the amounts of deviations between the first CIS 31A and the third CIS 31C and between the second CIS 31B and the third CIS 31C in the sheet conveying direction into consideration, and therefore the data over the entire width direction are detected continuously.

The configuration including multiple CISs (multiple contact image sensors), i.e., the first CIS 31A, the second CIS 31B, and the third CIS 31C is employed in the detecting device 30 that is applicable to handle a sheet having a large size in the width direction (for example, a detecting device that is capable of detecting a sheet of A3 elongation size). This configuration is used, for example, when achieving a reduction in cost, not by providing a single CIS dedicated to the specific size but by providing general CISs connecting in the width direction.

When the multiple CISs such as a set of the first CIS 31A and the second CIS 31B or a set of the first CIS 31A, the second CIS 31B, and the third CIS 31C are used, the whole detector (the multiple CISs) easily shifts to cause angular displacement and lateral displacement. Accordingly, the configuration according to this disclosure is preferably used.

As described above, in the detecting device 30 (of the image forming apparatus 1) according to the present embodiment, the revolver 35 (the rotary body) is disposed at a position opposed to the CIS 31 (the detector) so that the sheet P is conveyed to the space between the revolver 35 and the CIS 31. The revolver 35 has the outer circumferential surface. The reference plane S on which the series line 36b extending in the width direction is formed is provided to a portion of the outer circumferential surface of the revolver 35. When the sheet P does not intervene between the CIS 31 and the revolver 35, the CIS 31 detects the series line 36b formed on the reference plane S at the predetermined timing while the revolver 35 is rotating.

Accordingly, the attitude of the CIS 31 in the sheet conveying direction and the attitude of the CIS 31 at an angle on the plane of sheet conveyance are grasped.

It is to be noted that, in the present embodiment, this disclosure is applied to the detecting device 30 provided to the image forming apparatus 1 that performs monochrome image formation. However, this disclosure is not limited thereto. For example, this disclosure is also applied to a detecting device provided to an image forming apparatus that performs color image formation.

Further, it is to be noted that the detecting device 30 provided to the image forming apparatus 1 that employs electrophotography is applied in the present embodiment of this disclosure. However, the configuration of the image forming apparatus 1 is not limited thereto but is applicable to any image forming apparatus having different methods. For example, this disclosure is also applicable to an image forming apparatus that employs an inkjet method or to an offset printing machine.

Further, in the present embodiment of this disclosure, the CIS 31 (the detector) optically detects each of the position of the sheet, the position of an image formed on the surface of the sheet, and the image formed on the surface of the sheet. However, the configuration of the detector is not limited thereto. For example, this disclosure is also applicable to a detector that optically detects at least one of the position of the sheet, the position of an image formed on the surface of the sheet, and the image formed on the surface of the sheet. Further, the detector is not limited to a CIS but is applicable to other various types.

Further, even if any of the above-described configurations is employed, the same effect as in the present embodiment can be achieved.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims.

Further, features of components of the embodiments, such as the number, the position, and the shape are not limited the embodiments and thus may be preferably set.

It is to be noted that the term "sheet" of the present embodiment includes paper, coated paper, label paper, OHP sheet, film, cloth and the other sheet-like member. Further, it is to be noted that the term "sheet" includes an original document on which an image is formed thereon.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A detecting device comprising:
   a detector configured to optically detect at least one of a position of a sheet, a position of an image formed on the sheet, and the image formed on the sheet; and
   a rotary body disposed at a position opposed to the detector and having a shaft, the rotary body being rotatable about the shaft in a sheet conveying direction of the sheet,
   the sheet being conveyed by a conveyor to a space between the detector and the rotary body,
   the rotary body having a reference plane on an outer circumferential surface, a line formed on the reference plane and extending in a width direction perpendicular to the sheet conveying direction,
   the detector detecting the line on the reference plane while the rotary body is rotating at a given timing when the sheet does not intervene between the detector and the rotary body,
   the rotary body including a groove extending on the outer circumferential surface of the rotary body in the width direction and having a bottom face of white color, and a light transmitting body fitted into the groove and through which light is transmitted,
   the reference plane of the rotary body formed on an opposed face of the light transmitting body, and
   when the rotary body is rotated about the shaft to cause the light transmitting body to be opposed to the detector, the detector detects the line with the bottom face as a background face to detect an attitude of the detector.

2. The detecting device according to claim 1,
   wherein the attitude of the detector is obtained based on a detection result of the line obtained by the detector at the given timing, and
   wherein a detection result obtained by the detector to detect the sheet to be conveyed to the space between the detector and the rotary body is corrected based on the detection result of the attitude of the detector.

3. The detecting device according to claim 1,
   wherein the rotary body has a plurality of parallel lines formed on the reference plane, the plurality of parallel lines extending in the sheet conveying direction and disposed at equal intervals in the width direction, and
   wherein the detector detects the plurality of parallel lines formed on the reference plane when the sheet does not intervene the detector and the rotary body and before the detector detects the line at the given timing while the rotary body is stopped.

4. The detecting device according to claim 3,
wherein an attitude in the width direction of the detector is obtained before the given timing based on a detection result of the plurality of parallel lines by the detector, and
wherein the detection result of the detector that detects the sheet to be conveyed to the space between the detector and the rotary body is corrected based on a detection result of the attitude in the width direction of the detector.

5. The detecting device according to claim 1,
wherein the rotary body has a plurality of parallel lines formed on the reference plane, the plurality of parallel lines extending in the sheet conveying direction and disposed at equal intervals in the width direction, and
wherein the detector detects the plurality of parallel lines formed on the reference plane when the sheet does not intervene the detector and the rotary body and after the detector has detected the line at the given timing while the rotary body is stopped.

6. The detecting device according to claim 5,
wherein an attitude in the width direction of the detector is obtained after the given timing based on a detection result of the plurality of parallel lines by the detector, and
wherein the detection result of the detector that detects the sheet to be conveyed to the space between the detector and the rotary body is corrected based on a detection result of the attitude in the width direction of the detector.

7. The detecting device according to claim 1,
wherein the rotary body has a cylindrical shape, and
wherein the detector includes one of a contact image sensor disposed extending in the width direction, a plurality of contact image sensors disposed in parallel to the width direction, and a plurality of contact image sensors disposed in a zigzag shape in the width direction.

8. The detecting device according to claim 1,
wherein the rotary body includes a roller rotatably provided and separately rotated from the rotary body, and
wherein, in a state in which the roller is disposed facing the detector, the sheet is conveyed to the space between the detector and the rotary body while the roller is rotating along the sheet conveying direction.

9. An image forming apparatus comprising the detecting device according to claim 1.

10. A detecting device comprising:
a detector configured to optically detect at least one of a position of a sheet, a position of an image formed on the sheet, and the image formed on the sheet; and
a rotary body disposed at a position opposed to the detector and having a shaft, the rotary body being rotatable about the shaft in a sheet conveying direction of the sheet,
the sheet being conveyed by a conveyor to a space between the detector and the rotary body,
the rotary body having a reference plane on an outer circumferential surface, a line formed on the reference plane and extending in a width direction perpendicular to the sheet conveying direction,
the detector detecting the line on the reference plane while the rotary body is rotating at a given timing when the sheet does not intervene between the detector and the rotary body,
wherein the rotary body includes a roller rotatably provided and separately rotated from the rotary body, and
wherein, in a state in which the roller is disposed facing the detector, the sheet is conveyed to the space between the detector and the rotary body while the roller is rotating along the sheet conveying direction.

11. The detecting device according to claim 10,
wherein an attitude of the detector is obtained based on a detection result of the line obtained by the detector at the given timing, and
wherein a detection result obtained by the detector to detect the sheet to be conveyed to the space between the detector and the rotary body is corrected based on the detection result of the attitude of the detector.

12. The detecting device according to claim 10,
wherein the rotary body has a plurality of parallel lines formed on the reference plane, the plurality of parallel lines extending in the sheet conveying direction and disposed at equal intervals in the width direction, and
wherein the detector detects the plurality of parallel lines formed on the reference plane when the sheet does not intervene the detector and the rotary body and before the detector detects the line at the given timing while the rotary body is stopped.

13. The detecting device according to claim 12,
wherein an attitude in the width direction of the detector is obtained before the given timing based on a detection result of the plurality of parallel lines by the detector, and
wherein the detection result of the detector that detects the sheet to be conveyed to the space between the detector and the rotary body is corrected based on a detection result of the attitude in the width direction of the detector.

14. The detecting device according to claim 10,
wherein the rotary body has a plurality of parallel lines formed on the reference plane, ti plurality of parallel lines extending in the sheet conveying direction and disposed at equal intervals in the width direction, and
wherein the detector detects the plurality of parallel lines formed on the reference plane when the sheet does not intervene the detector and the rotary body and after the detector has detected the line at the given timing while the rotary body is stopped.

15. The detecting device according to claim 14,
wherein an attitude in the width direction of the detector is obtained after the given timing based on a detection result of the plurality of parallel lines by the detector, and
wherein the detection result of the detector that detects the sheet to be conveyed to the space between the detector and the rotary body is corrected based on a detection result of the attitude in the width direction of the detector.

16. The detecting device according to claim 10,
wherein the rotary body has a cylindrical shape, and
wherein the detector includes one of a contact image sensor disposed extending in the width direction, a plurality of contact image sensors disposed in parallel to the width direction, and a plurality of contact image sensors disposed in a zigzag shape in the width direction.

17. An image forming apparatus comprising the detecting device according to claim 10.

* * * * *